(12) United States Patent
Ngai et al.

(10) Patent No.: US 9,753,727 B2
(45) Date of Patent: Sep. 5, 2017

(54) PARTIAL VECTORIZATION COMPILATION SYSTEM

(71) Applicant: Intel Corporation, Santa Clara, CA (US)

(72) Inventors: Tin-Fook Ngai, San Jose, CA (US); Chunxiao Lin, Beijing (CN); Yingzhe Shen, Beijing (CN); Chao Zhang, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/995,721

(22) PCT Filed: Oct. 25, 2012

(86) PCT No.: PCT/CN2012/083476
§ 371 (c)(1),
(2) Date: Dec. 11, 2013

(87) PCT Pub. No.: WO2014/063323
PCT Pub. Date: May 1, 2014

(65) Prior Publication Data
US 2014/0122832 A1    May 1, 2014

(51) Int. Cl.
*G06F 9/30* (2006.01)
*G06F 9/45* (2006.01)

(52) U.S. Cl.
CPC ......... *G06F 9/30036* (2013.01); *G06F 8/433* (2013.01); *G06F 8/4441* (2013.01); *G06F 8/452* (2013.01)

(58) Field of Classification Search
CPC .......... G06F 8/452; G06F 8/433; G06F 9/441; G06F 9/30036
See application file for complete search history.

(56) References Cited

U.S. PATENT DOCUMENTS 5,802,375 A * 9/1998 Ngo et al. ............... 717/160
7,712,091 B2   5/2010 Muthukumar et al.
(Continued)

FOREIGN PATENT DOCUMENTS

CN   101044457 A   9/2007
WO   2012/134322 A1  10/2012

OTHER PUBLICATIONS

Unknown Author, "Enhanced Loop Flattening for Software Pipelining of Arbitrary Loop Nests", Jun. 11, 2010.*
(Continued)

*Primary Examiner* — Li B Zhen
*Assistant Examiner* — Amir Soltanzadeh
(74) *Attorney, Agent, or Firm* — Grossman, Tucker, Perreault & Pfleger, PLLC

(57) ABSTRACT

Generally, this disclosure provides technologies for generating and executing partially vectorized code that may include backward dependencies within a loop body of the code to be vectorized. The method may include identifying backward dependencies within a loop body of the code; selecting one or more ranges of iterations within the loop body, wherein the selected ranges exclude the identified backward dependencies; and vectorizing the selected ranges. The system may include a vector processor configured to provide predicated vector instruction execution, loop iteration range enabling, and dynamic loop dependence checking.

16 Claims, 11 Drawing Sheets

(56) References Cited

U.S. PATENT DOCUMENTS

| | | |
|---|---|---|
| 2004/0003381 A1 | 1/2004 | Suzuki et al. |
| 2007/0079302 A1* | 4/2007 | Muthukumar et al. ....... 717/151 |
| 2011/0265067 A1* | 10/2011 | Schulte .................. G06F 8/456 717/148 |

OTHER PUBLICATIONS

Ron Cytron, "Efficiently Computing Static Single Assignment Form and the Control Dependence Graph", Oct. 1991.*
International Search Report and Written Opinion for PCT Patent Application No. PCT/CN2012/083476, mailed on Aug. 1, 2013, 12 pages.
Ghuloum et al., "Flattening and Parallelizing Irregular, Recurrent Loop Nests", Carnegie Mellon University, 1995.
Nie et al., "Vectorization for Java", Intel China Research Center.
von Hanxleden, et al., "Relaxing SIMD Control Flow Constraints Using Loop Transformations", Rice University, Apr. 1992.
Partial Supplementary European Search Report issued in corresponding European Application No. 12886955.9, dated May 19, 2016.
Hammer, C., et al.: "Code Generation for Partially Vectorizable Loops in the Vectorizing Pascal-XT Compiler", Springe Berlin Heidelberg, Sep. 17, 1986, pp. 295-302.
International Preliminary Report on Patentability and Written Opinion for PCT Patent Application No. PCT/CN2012/083476, mailed on May 7, 2015, 8 pages.
European Communication issued in European Application No. 12886955.9, dated Apr. 26, 2017, 3 pages.
Chinese Office Action issued in Chinese Application No. 201280076012.1, dated May 12, 2017, with English translation, 19 pages.
Extended European Search Report issued in European Application No. 12886955.9, dated Sep. 6, 2016, 10 pages.
Chinese Office Action issued in Chinese Application No. 201280076012.1, dated Dec. 20, 2016, with English translation of Office Action and partial translation of NPL3 and NPL4, 17 pages.
English translation of Search Report issued in Chinese Application No. 201280076012.1, dated Dec. 12, 2016, 3 pages.
Wang Di, "Study on Optimization Technique of SIMD Compilation", Excellent Mastership Theses In China, Information Science and Technique volume, Jul. 15, 2009, 22 pages. Concise explanation of relevance provided by NPL1.
Huang Lei, Study on Application of Cyclic Transformation Technique in Automatic Vectorization, Excellent Mastership Theses In China, Information Science and Technique volume, Jul. 15, 2012, 37 pages. Concise explanation of relevance provided by NPL1.

* cited by examiner

```
elementCount = 0;
p1 = (1,1,1, ...) ; //The number of valid bits is VL
for (i = 0; i < k; i++) {
    a = pointerArray [i] ;
    b = array [i] ;
    for (c = a; c; c=c->next) {
        temp_b [elementCount] = b;
        temp_c [elementCount] = c;
        elementCount = elementCount + 1;
        if (elementCount < VL) continue;
        else elementCount = 0;
        ...
        p1: VAdd (V1, temp_b constantValue) ;
        p1: VScatter (temp_c, offset_of_el, V1) ;
        ...
    }
    //Remainder
    if (elementCount > 0) {
        p1 = (1,1,1, ...) ; //The number of valid bits is element_count
        p1: VAdd (V1, temp_b constantValue) ;
        p1: VScatter (temp_c, offset_of_el, V1) ;
    }
}
```

408 → (points to top)
410 → for loop
412 → Pre-processing statements
414 → Vectorized inner loop body
416 → Remainder

FIG. 4

```
for (i=0; i<k; i++)
{
    a = pointerArray [i] ;
    b = array [i] ;
    for (c = a; c; c=c->next)
    {
        ...
        c->el = b + constantValue;
        ...
    }
}
```

402, 404, 406

420 → 422

PARTIAL VECTORIZATION COMPILATION SYSTEM

FIELD

The present disclosure relates to compilation technologies, and more particularly, to compilation systems with partially vectorized code generation.

BACKGROUND

Vector processors generally enable increased program execution speed by providing a vector processing unit, which includes a number of scalar units/processors, to process multiple data elements or data arrays in parallel. The number of scalar units/processors available is often referred to as the vector length. Instructions executed by a vector processing unit are vector instructions which may specify both an operation and arrays of data on which to operate in parallel. Each scalar unit/processor executes the operation on corresponding elements of arrays of data. Vectorizing compilers exist which typically convert code from a natural form, for example a form convenient for human programmers to read and write, into a form that is suitable for execution by the vector processor. They typically identify independent instructions of an operation, rearrange the corresponding data operands into data arrays, and convert them into the corresponding vector instruction. This process is called vectorization.

These existing compilers, however, often fail to vectorize regions of code due to dependency problems. For example, two different instructions cannot be executed in parallel if the execution of the second instruction depends in some way on the results of the execution of the first instruction. When such dependency problems are detected, the compiler may designate regions of code of increased size as unsuitable for vectorization. As a result, the potential of vector processing may not be fully realized.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

FIG. 4 illustrates loop flattening consistent with an exemplary embodiment of the present disclosure;

Although the following Detailed Description will proceed with reference being made to illustrative embodiments, many alternatives, modifications, and variations thereof will be apparent to those skilled in the art.

DETAILED DESCRIPTION

Generally, this disclosure provides systems and methods for generating and executing partially vectorized code. Partial vectorization may enable the vectorization of code loops that include backward dependencies. This may be accomplished by determining ranges of iterations of those loops that exclude the backward dependencies so that those ranges may be selected and enabled for vectorization and execution.

The ranges may be determined, statically or dynamically, by generating and analyzing a loop dependence graph (LDG) for loop body sections of code. Nodes of the LDG may correspond to vectorization units of the code, for example statements, expressions and operations, while edges of the LDG may correspond to control and/or data dependence relations between the nodes.

In some embodiments, nested loops of code may be identified and inner loops may be flattened, prior to partial vectorization. In some embodiments, the vector processor may provide dynamic run-time checking of the dependency estimates of the partially vectorized code and provide for recovery in the case of an erroneous estimate.

Figure 1:
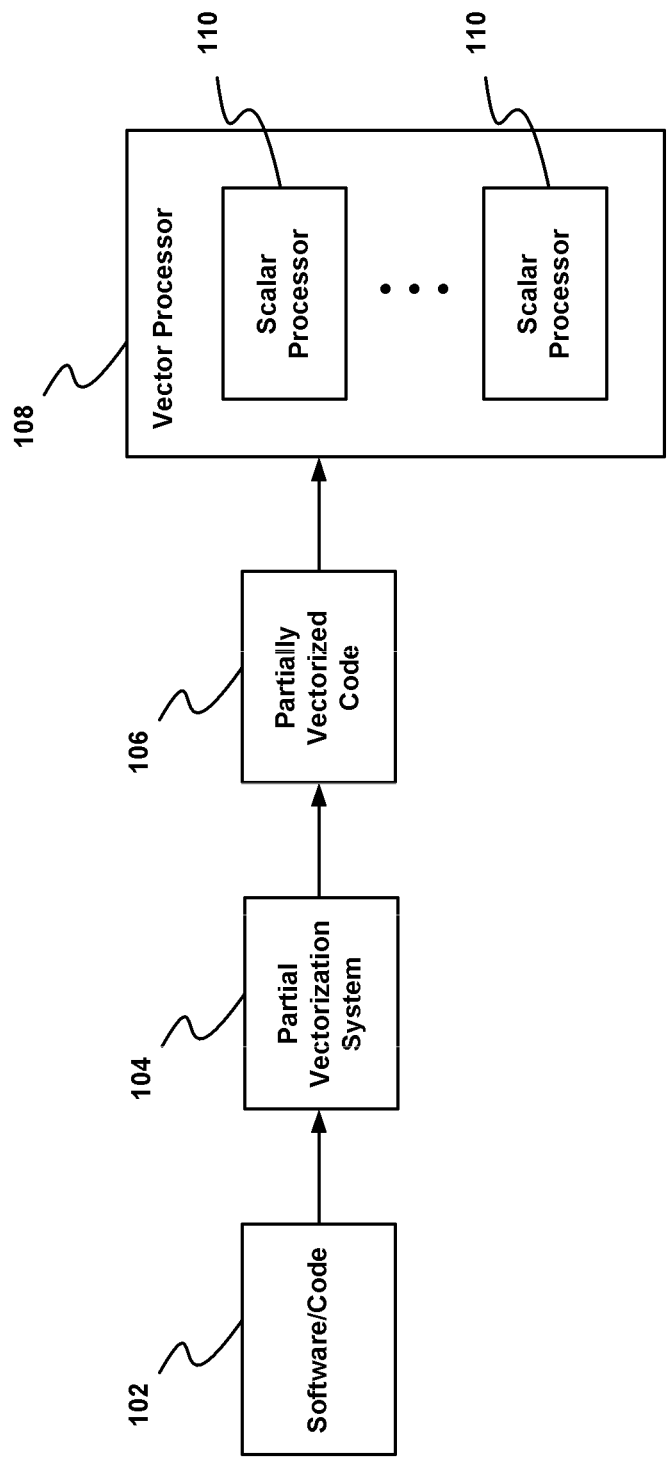
FIG. 1 illustrates a top level system diagram of one exemplary embodiment consistent with the present disclosure.

FIG. 1 illustrates a top level system diagram 100 of one exemplary embodiment consistent with the present disclosure. Software or code 102 may be provided to and processed by partial vectorization system 104 to generate partially vectorized code 106 as will be explained in greater detail below. The partially vectorized code 106 may then be executed on a vector processor 108 which may include a number (i.e., the vector length) of scalar units/processors 110 to increase program execution speed.

Figure 2:
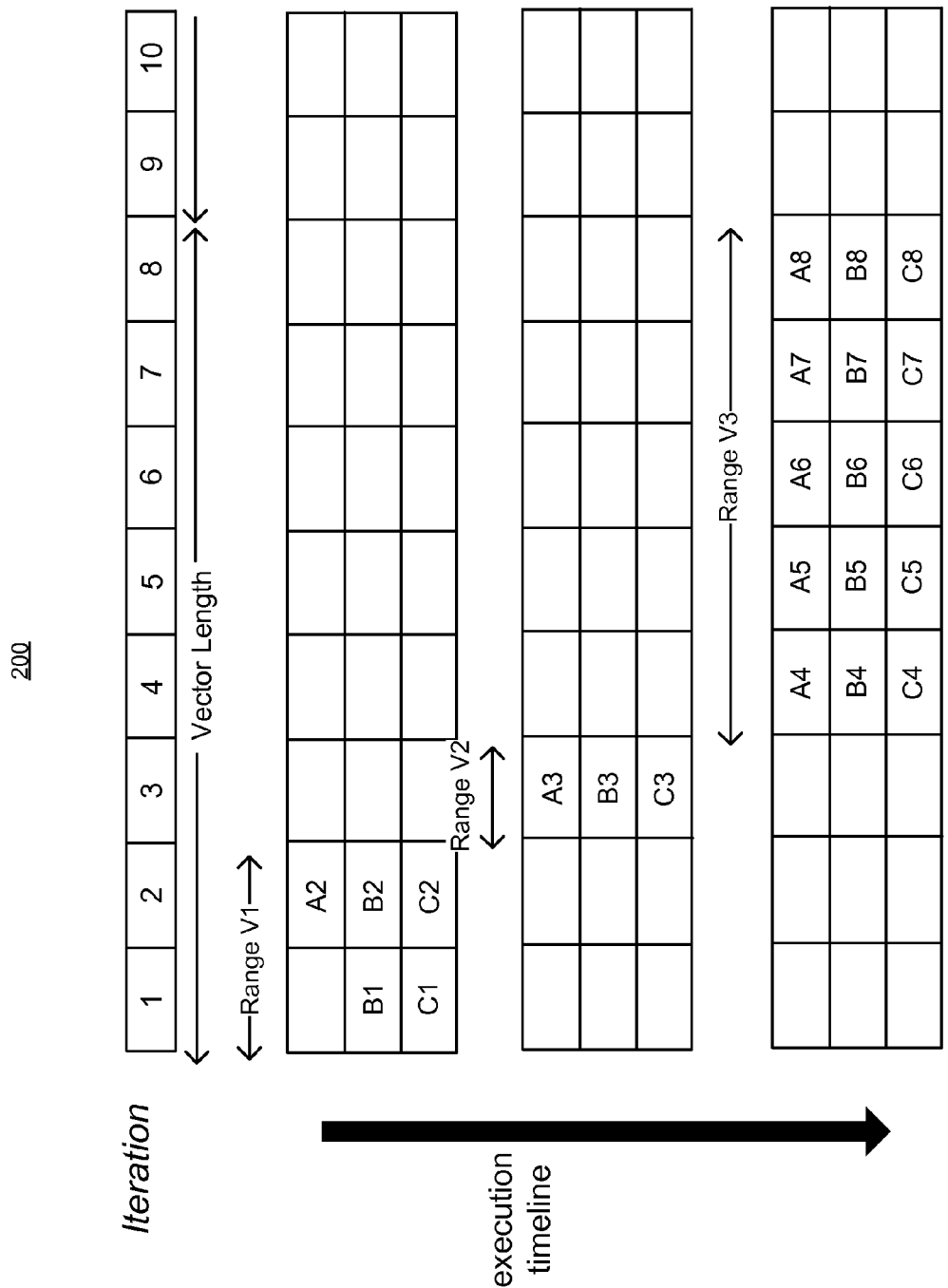
FIG. 2 illustrates a plot of partial vectorization consistent with an exemplary embodiment of the present disclosure.

FIG. 2 illustrates a plot of partial vectorization 200 consistent with an exemplary embodiment of the present disclosure. In this example, a segment of code includes a loop body that contains 3 statements, A, B, and C, which will be iterated a number of times. This may be written, for example, as:

for ($i=0$; $i<k$; $i++$)$\{A; B; C;\}$

The horizontal axis represents iterations and the vertical axis represents execution time. The vector processor has a vector length of 8 (i.e., 8 scalar units/processors that may execute in parallel). If there were no dependencies in the code it might be possible to achieve full processor utilization by executing iterations 1 through 8 in parallel on each of the 8 scalar units/processors. This would be followed by executing iterations 9 through 16 in the same parallel manner, and so on until the desired number of loop iterations is completed.

The existence of dependencies within the code, however, will typically prevent full vectorization. For example, iteration 3 may execute only after iteration 2 has completed and iteration 4 cannot start before iteration 3 completes. Partial vectorization may be achieved, however, as will be described below, resulting in this example illustration where iterations 1 and 2 are vectorized and executed in parallel (range V1) over a first time interval, followed by the execution of iteration 3 which could not be vectorized (range V2) over a second time interval, followed lastly by the execution of iterations 4 through 8 executed in parallel (range V3) over a third time interval. Partial vectorization, in this example, provides a performance improvement by 8 iterations in 3 time intervals as opposed to the 8 time intervals that would be required if no vectorization were performed.

Figure 3:
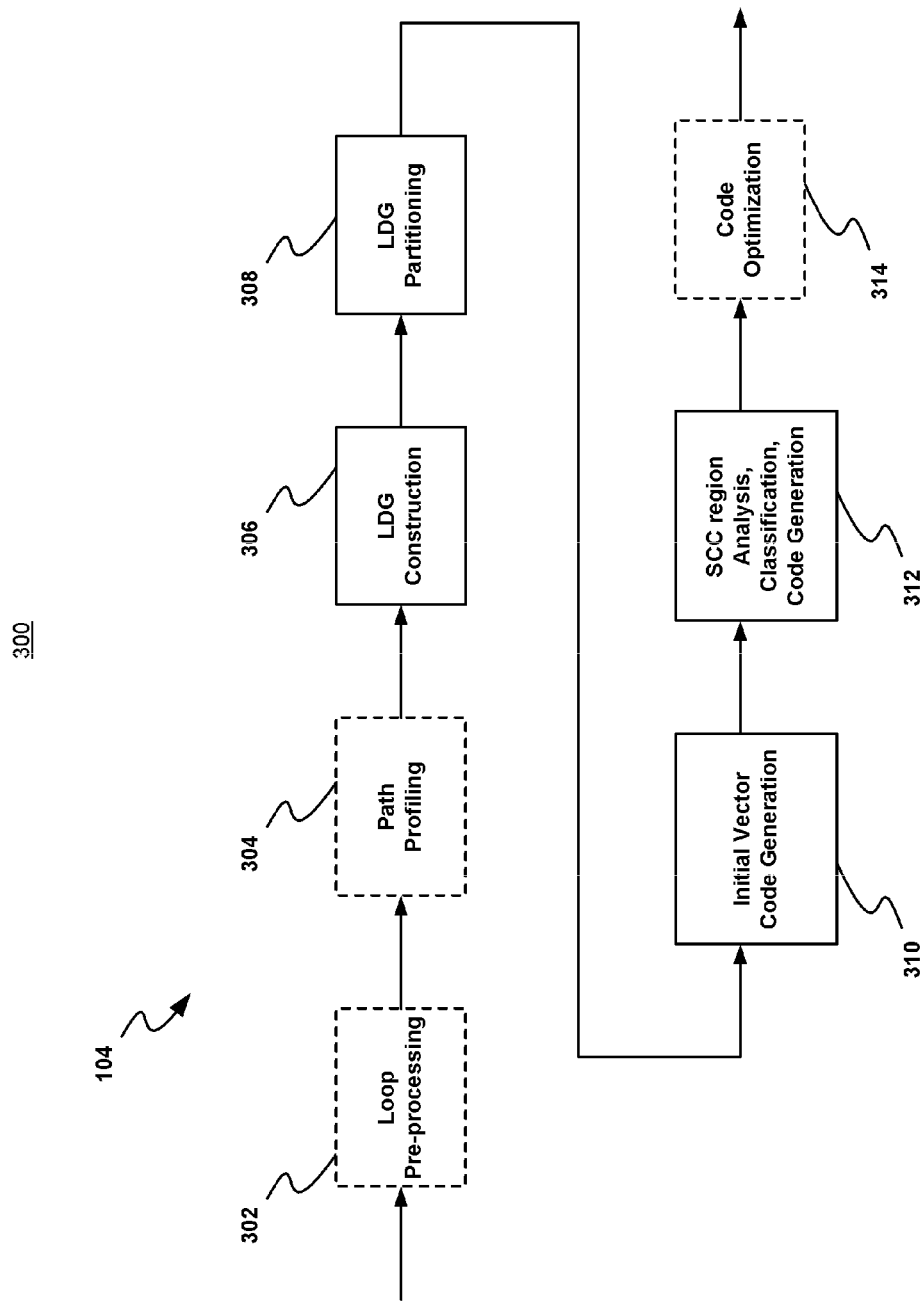
FIG. 3 illustrates a block diagram of one exemplary embodiment consistent with the present disclosure.

FIG. 3 illustrates a block diagram 300 of one exemplary embodiment consistent with the present disclosure. Partial vectorization system 104 is shown to include an LDG construction module 306, an LDG partitioning module 308, an initial vector code generation module 310 and a Strongly Connected Code (SCC) region analysis, classification and code generation module 312. Also shown are optional loop pre-processing module 302, path profiling module 304 and code optimization module 314.

LDG construction module 306 may be configured to analyze code segments that contain loops and to generate a graph including nodes and edges (i.e., lines that connect the nodes) as will be explained in greater detail below. The nodes may represent vectorization units such as statements, expressions or operations, in other words an item of code that can be executed on one of the scalar units/processors. The edges may represent dependency relationships between the nodes and may be data dependencies or control dependencies.

LDG partitioning module 308 may be configured to partition the graph into regions that are vectorizable (VR regions) and regions that include Strongly-Connected Components (SCC regions) as will be explained in greater detail below. The VR regions generally do not have dependency loops within them while the SCC regions generally do contain dependency loops and are therefore difficult to vectorize. The initial vector code generation module 310 may be configured to generate a first version of vectorized code as will be explained in greater detail below. The SCC region analysis, classification and code generation module 312 may be configured to process and vectorize the SCC code regions as will be explained in greater detail below.

In some embodiments, optional loop pre-processing module 302 may be configured to perform loop invariant identification and hoisting, function in-lining and loop transformations that include height reduction, special expression rewriting and loop folding. Loop pre-processing module 302 may also be configured to perform nested loop transformations (loop flattening) that expose additional opportunities for vectorization.

In some embodiments, optional path profiling module 304 may be configured to identify "hot" (more frequently executed) and "cold" (less frequently executed) paths within loop bodies. Cold paths that contain more difficult to vectorize code segments may then be left un-vectorized without adversely affecting the overall performance of the vectorized loop.

In some embodiments, optional code optimization module 314 may be configured to perform strength reduction on the resultant partially vectorized code.

FIG. 4 illustrates loop flattening operation 400 consistent with an exemplary embodiment of the present disclosure. Loop flattening, which may be performed by loop pre-processing module 302, transforms nested loops into a format that facilitates the partial vectorization process by flattening the inner loop. A segment of code 402 includes an outer loop 404 and an inner loop 406. The transformed version of the code 408 has a flattened inner loop 410 with pre-processing statements 412 configured to collect the loop live-in and live-out variables (b, c) into temporary vectors (temp_b, temp_c). The pre-processing statements 412 are iterated until the temporary vectors are filled up to the vector length, at which point the vectorized inner loop body 414 is executed. The transformed code also has a remainder section 416 to handle any remaining elements that do not reach a full vector length before the final iteration occurs.

An example 420 is shown for the case where there are 4 iterations of the outer loop (i.e., k=4) and each box represents an iteration of the inner loop. In this example there are 3 iterations of the inner loop for i=0, 6 iterations of the inner loop for i=1, 5 iterations of the inner loop for i=2, and 2 iterations of the inner loop for i=3. The inner loop is shown after transformation to a flattened state 422 for a vector length of 4. The iterations have been evenly redistributed (or flattened) over the 4 scalar units/processors.

Figure 5:
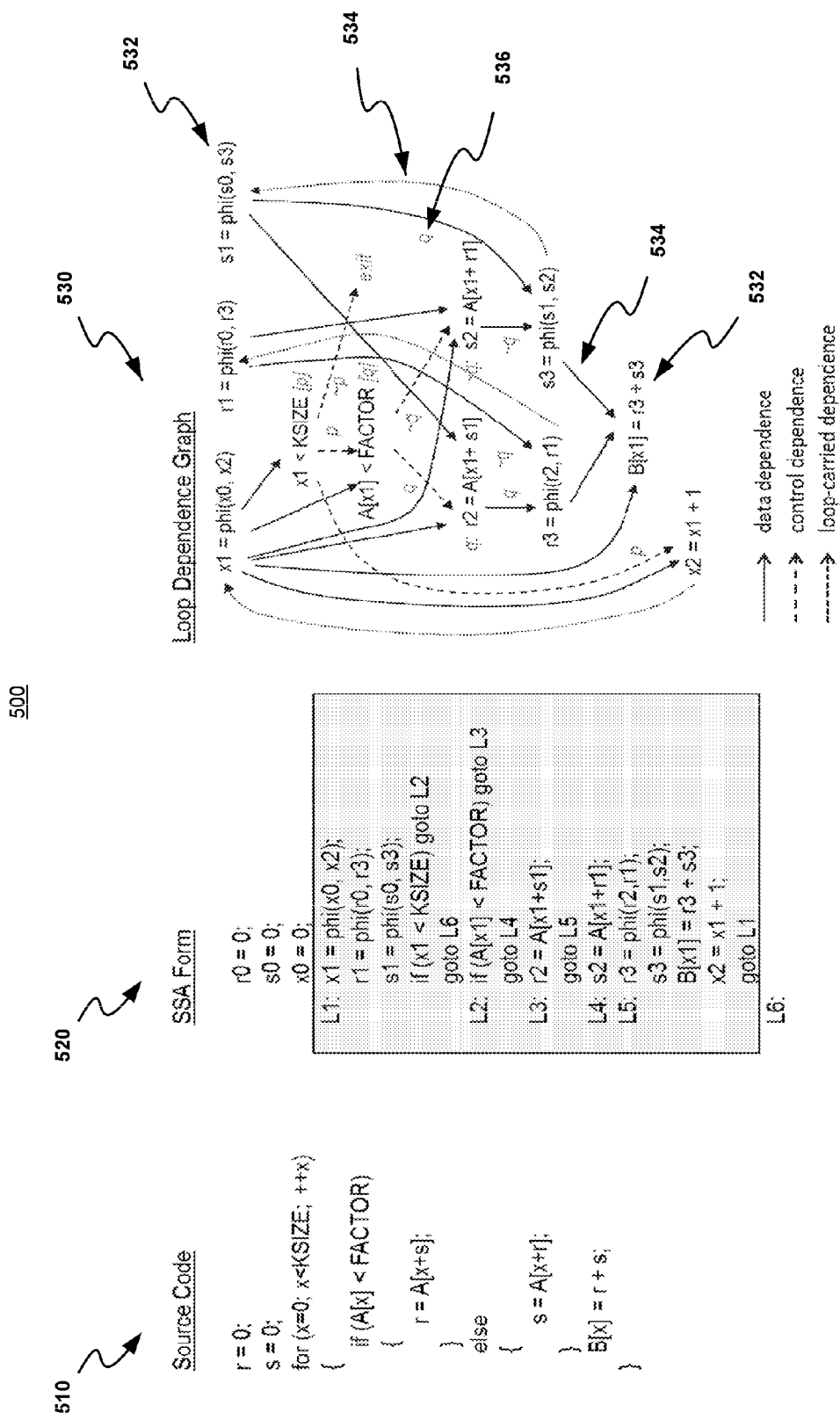
FIG. 5 illustrates loop dependence graph generation consistent with an exemplary embodiment of the present disclosure.

FIG. 5 illustrates loop dependence graph generation 500 consistent with an exemplary embodiment of the present disclosure. An example of a source code segment is shown 510. The source code segment 510 may be processed by LDG construction module 306 to produce LDG 530. The source code may first be converted to Static Single Assignment (SSA) form 520 by performing an SSA analysis. The SSA analysis assigns a unique variable name to the target of each assignment statement. For example the variable r takes on a different version (e.g., r0, r1, r2, r3) for each instance where its value can be changed. The SSA analysis also inserts phi functions to indicate instances where a choice will be made as to which version of a variable will be used.

The resulting SSA form 520 may then be used for the generation of the LDG 530 as an alternative representation of the source code 510 which is useful for the further analysis in preparation for partial vectorization. The LDG 530 includes nodes 532 and edges 534 (i.e., lines that connect the nodes). The nodes 532 may represent vectorization units such as statements, expressions or operations, in other words an item of code that can be executed on one of the scalar units/processors. The edges 534 may represent dependency relationships between the nodes and may be data dependence edges (DDEs) or control dependence edges (CDEs). The data dependencies may be further analyzed to classify them as being either "strong" (sDDE) or "weak" (wDDE), where a "strong" data dependence represents a certain or relatively likely dependence while a "weak" data dependence represents only a relatively low possibility of dependence. For, example, a node representing "s=x+y" strongly depends on another node representing "x=a+b," because of the definite link through the variable "x." In contrast, a node representing "s=A[x]" only weakly depends on another node representing "A[y]=a," because the dependence is possible but uncertain and less likely, depending on the values of "x" and "y" at run time.

The data dependencies may also be tagged with predicates 536 (e.g., the p's and q's in LDG 530) that are associated with nodes that generate conditional testing results (e.g., true or false). For control dependence edges the predicates may be controlling predicates and for data dependence edges the predicates may be enabling predicates as will be described in greater detail below.

In some embodiments, the data dependencies may also be tagged with the hot and cold path information generated by optional path profiling module 304. This information may be used to estimate the value of performing vectorization on associated segments of code.

Dependence distances may also be calculated for the edges 534. For example, a multidimensional array A, of m dimensions, may be associated with a first node (assigning to) and a second node (assigning from):

Node1: $A[f_1(i), \ldots, f_m(i)] = \ldots$ ;

Node2: $\ldots = A[h_1(i), \ldots, h_m(i)]$;

where f and h represent array index variables for each dimension as a function of the loop iteration index i. In this example, the distance σ on a DDE from Node 1 to Node 2, may be defined if $f_k(i) = h_k(i+\sigma)$ for all $i$, and $k=1, \ldots, m$.

Otherwise, distance σ is indefinite.

In LDG 530, edges with a distance other than 0 are marked as "loop-carried." Additionally, a scalar dependence from one iteration to the following iteration (like the $x_2$ dependence from Node 2 to Node 1 in the following example) is considered as a loop-carried dependence with distance 1.

Node1: $x_1 = phi(x_0, x_2)$;

Node2: $x_2 = x_1 + 1$;

If an edge dependence distance equals or exceeds the vector length, then that edge may be omitted because within the range of iterations spanned by vector instructions (i.e., vector-length iterations), the nodes that are connected by that edge are independent and can be executed in parallel.

Figure 6:
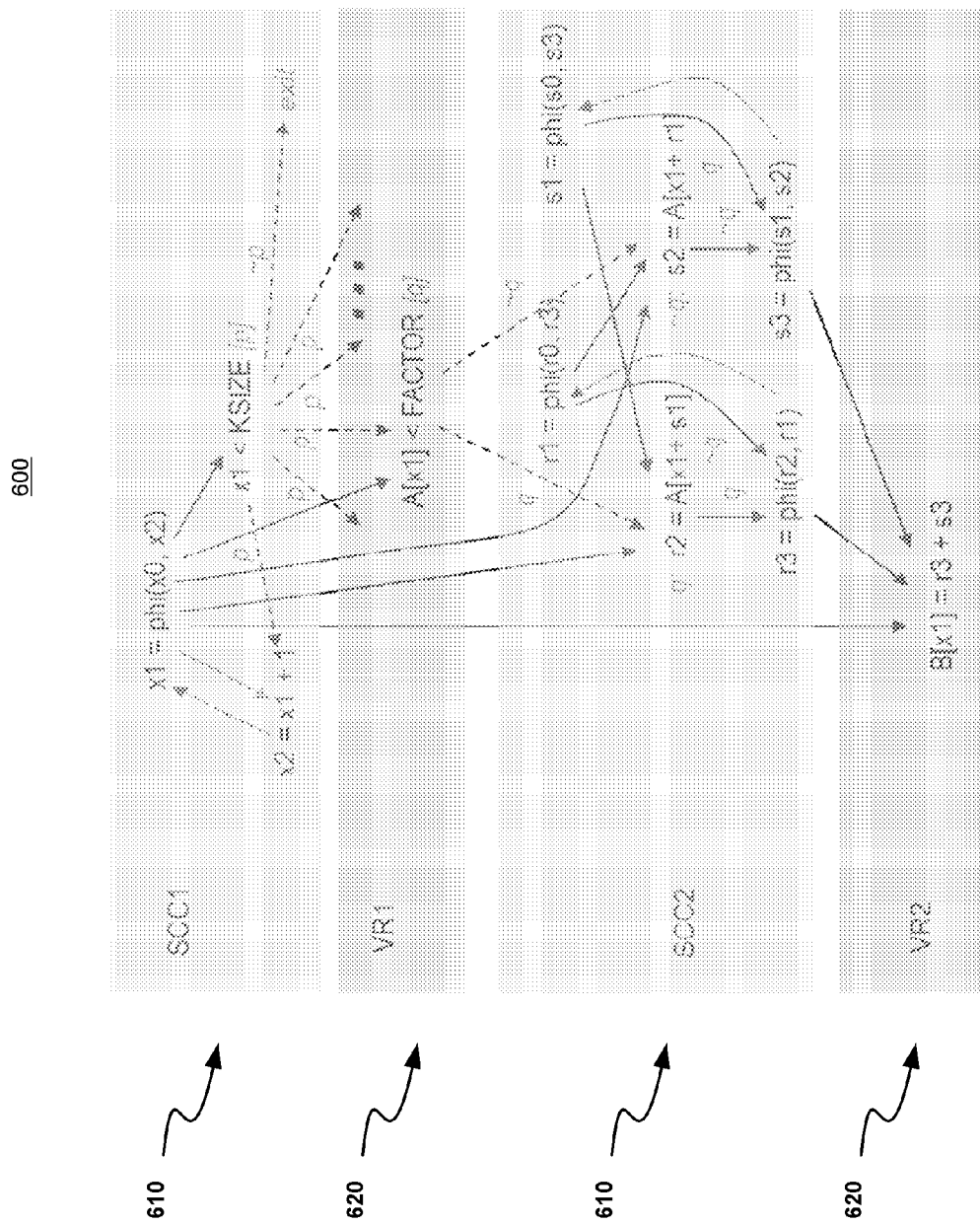
FIG. 6 illustrates a loop dependence graph partition consistent with an exemplary embodiment of the present disclosure.

FIG. 6 illustrates a loop dependence graph partition 600 consistent with an exemplary embodiment of the present disclosure. LDG partitioning module 308 may perform graph operations on LDG 530 to manipulate and partition the graph into VR regions 620 and SCC regions 610. The VR regions are free of dependency loops while the SCC regions may contain dependency loops. The regions 610, 620 are linked to each other by forward-dependency edges.

After partitioning, the initial vector code generation module 310 may generate the first version of vector code. The VR regions 620 may be initially vectorized by performing any or all of the following operations. "If" statements may be converted, to replace CDEs with predicate-guarded vector operations. For example, if$(p)x = y+z$ may be converted to $v\_p$: $v\_x = v\_\text{add}(v\_y, v\_z)$.

Enabling predicates associated with DDEs may be used to predicate vector operations that depend on those DDEs. The initial vector code generation module 310 may also vectorize all SCCs by transforming them into sequential inner loops with predicated vector operations. The predicate control vector enables only one vector position at a time and advances to the next vector position in the next iteration. Imitating the original scalar instruction, each predicated vector instruction operates on only a single element of the vector variable. Any value change of the single element in the current inner loop iteration is propagated to the following elements of the vector variable. A prolog may be generated that includes loop induction vector initialization, loop invariant vector assignments and/or any other pre-computations. An epilog may be generated that extracts the live-out scalar variables in current vector loop iteration and passes them to the following vector loop iteration.

The SCC region analysis, classification and code generation module 312 may be configured to process and vectorize the SCC code regions 610 by performing the following operations. First, the SCC regions are classified into one of three categories. The first category includes induction variables (e.g., variables that are adjusted by a fixed quantity on every iteration of a loop) and prefix computations (e.g., x=x+1). These cases are handled by generating the corresponding vector operations. For example, the following vector operations generate induction variable vector $V_i$ for the induction variable i=i+1 with initial value $i_0$:
$V_i = [i_o i_o i_o \ldots i_o] + [0\ 1\ 2 \ldots N]$ as the initial vector $V_i = V_i + [N\ N\ N \ldots N]$ for the following iterations.

The second category includes strictly sequential SCCs including pointer array chasing (e.g., x=x->next, etc.) These SCCs will remain in their form as sequential inner loops in the vectorized code. The third category includes conditionally vectorized SCCs. Within this third category there are three subcategories: control-induced data dependence, weak data dependence and speculative control. Each of these subcategories is explained in connection with FIGS. 7 through 9 respectively.

Figure 7:
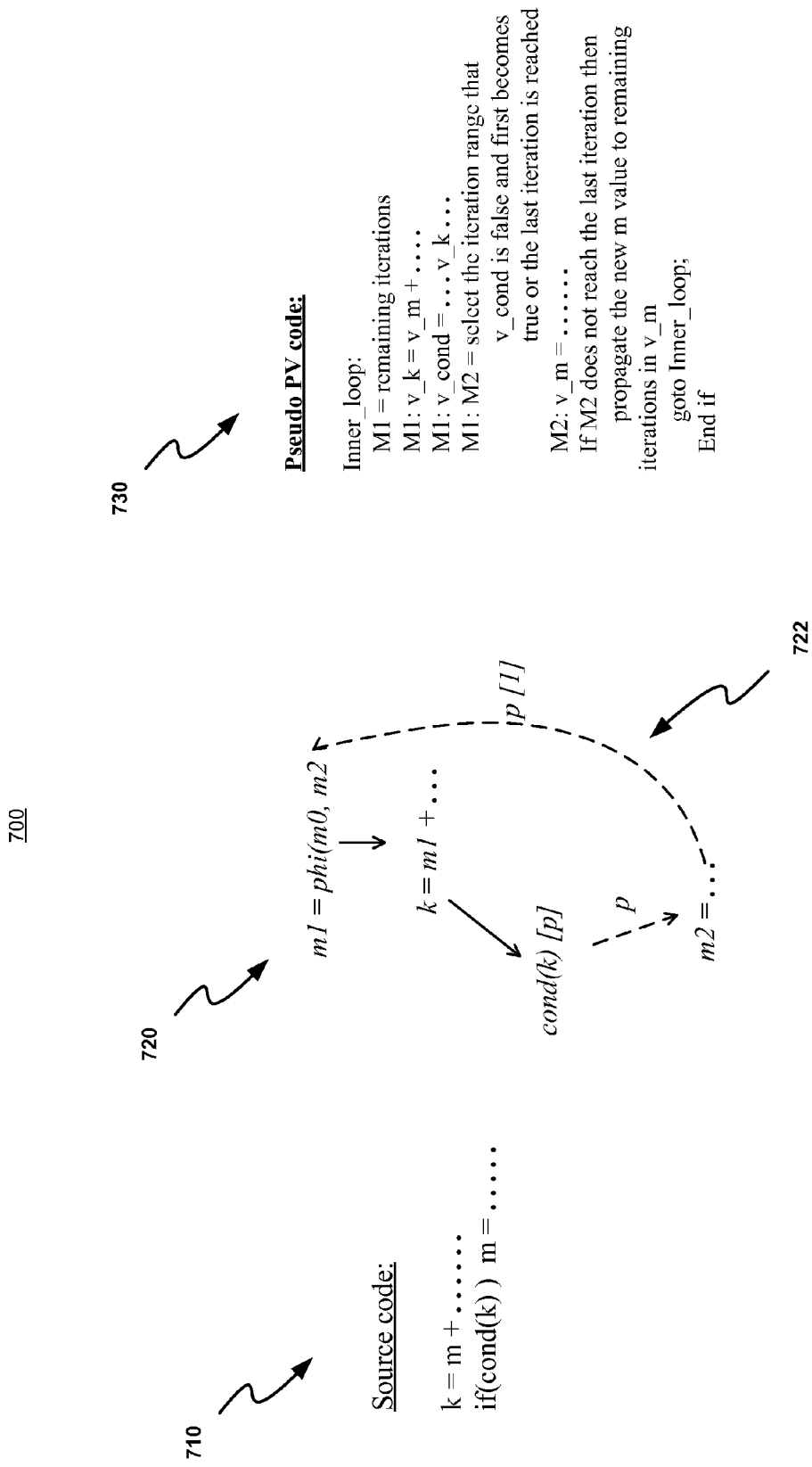
FIG. 7 illustrates an example of conditional vectorization consistent with an exemplary embodiment of the present disclosure.

FIG. 7 illustrates an example of conditional vectorization 700 consistent with an exemplary embodiment of the present disclosure. An example source code 710 and corresponding LDG 720 are shown which illustrate the control-induced data dependence case. A control-induced data dependence case may be identified by an SCC having a backward directed edge on only one conditional path 722. This case is handled by selecting and enabling iteration ranges wherein the backward directed edge conditions are invalid, and generating corresponding partially vectorized code and associated iteration range control code 730.

Figure 8:
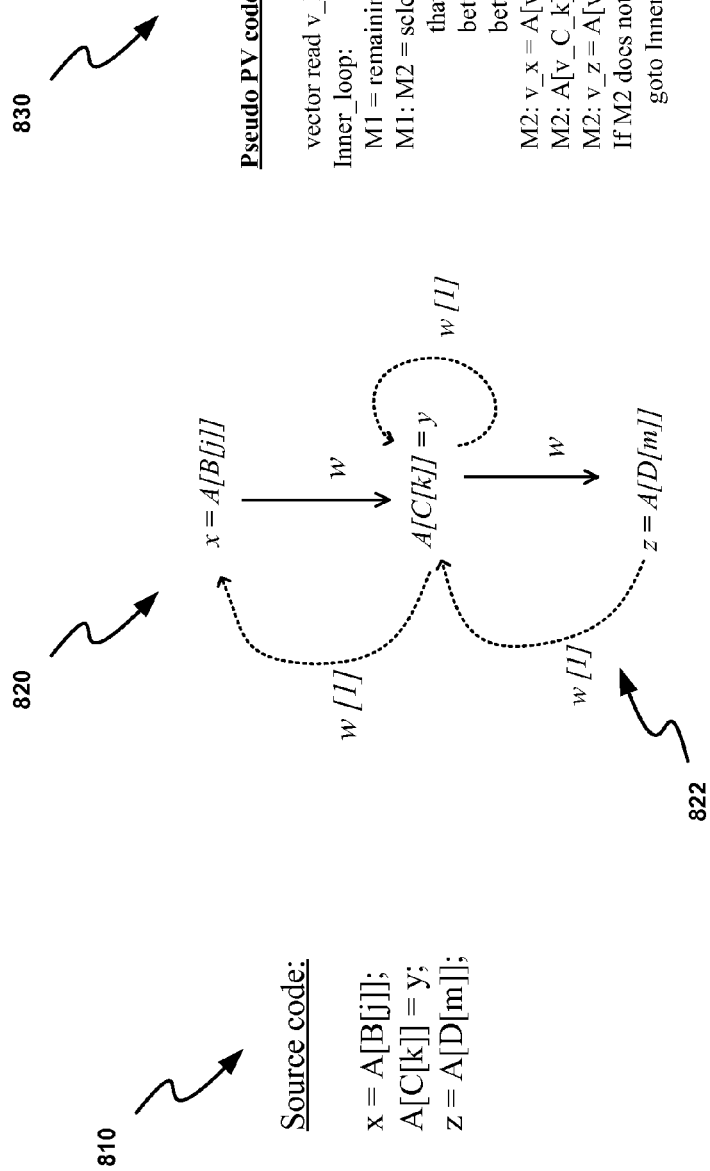
FIG. 8 illustrates another example of conditional vectorization consistent with an exemplary embodiment of the present disclosure.

FIG. 8 illustrates another example of conditional vectorization 800 consistent with an exemplary embodiment of the present disclosure. An example source code 810 and corresponding LDG 820 are shown which illustrate the weak data dependence case. A weak data dependence case may be identified by an SCC having backward directed edges that are all wDDE 822. This case is handled by checking for possible alias hazard conditions with the wDDEs and selecting and enabling iteration ranges within which those hazard conditions do not exist, and generating corresponding partially vectorized code and associated iteration range control code 830.

Figure 9:
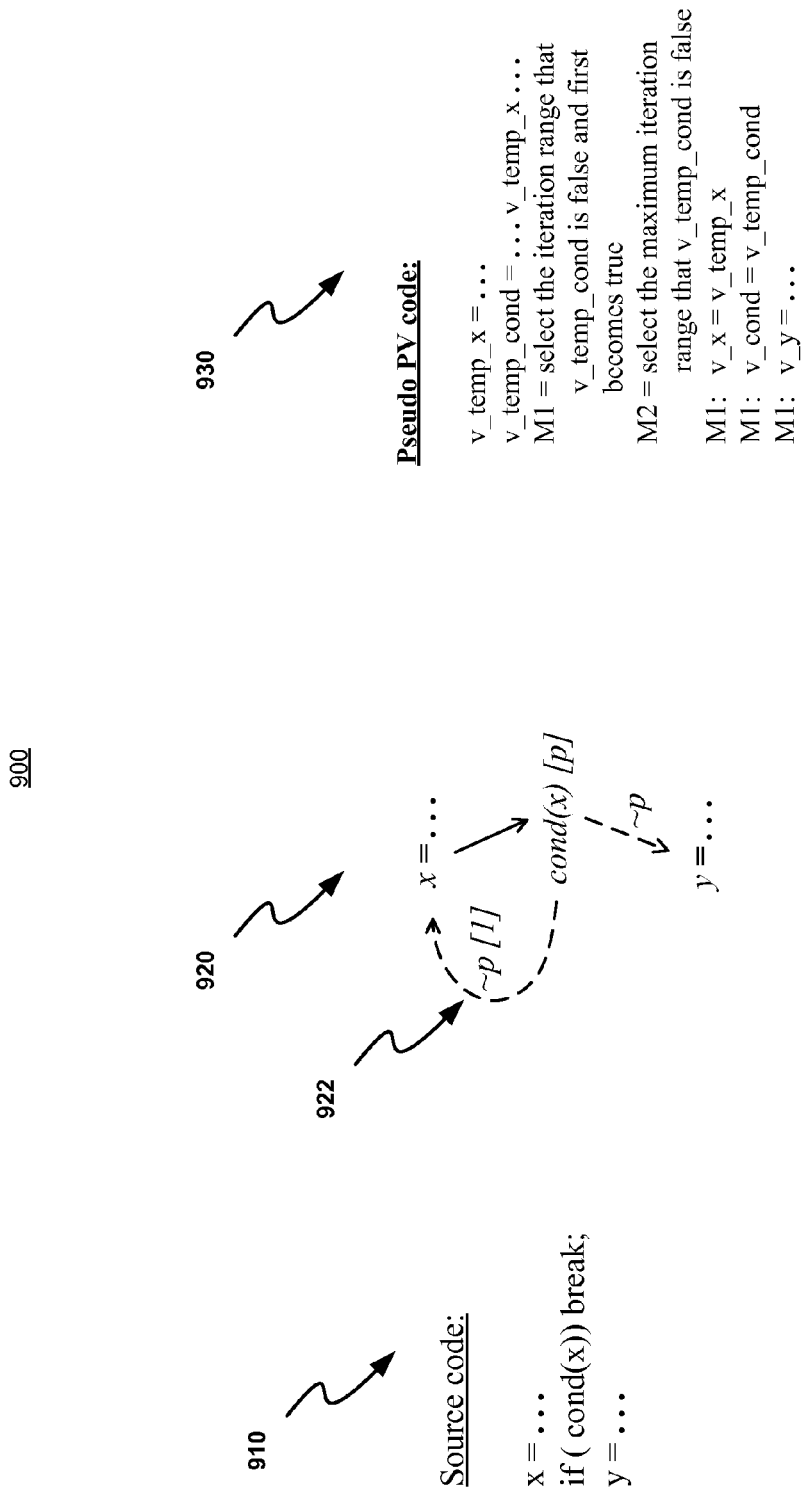
FIG. 9 illustrates another example of conditional vectorization consistent with an exemplary embodiment of the present disclosure.

FIG. 9 illustrates another example of conditional vectorization 900 consistent with an exemplary embodiment of the present disclosure. An example source code 910 and corresponding LDG 920 are shown which illustrate the speculative control case. A speculative control case may be identified by an SCC having backward directed edges that are loop carried CDEs 922. This case is handled by speculating on the backward control conditions and selecting and enabling iteration ranges within which the speculative backward conditions are valid, and generating the corresponding partially vectorized code 930 and, if necessary, miss-speculation correction code. Changes made during speculative execution are kept as temporary copies. If necessary, additional code is generated to compare speculative conditions with actual conditions. In case of miss-speculation, the temporary copies are discarded and the original code may be executed again. Otherwise, the temporary copies are committed to the corresponding variable vectors.

Figure 10:
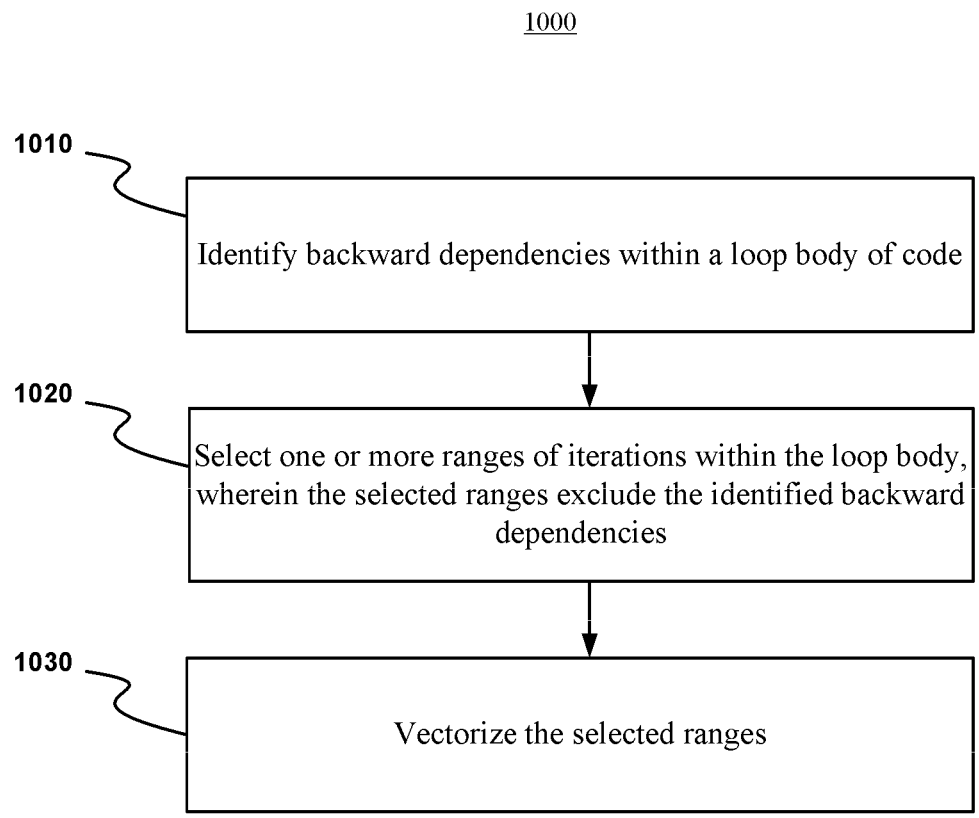
FIG. 10 illustrates a flowchart of operations of an exemplary embodiment consistent with the present disclosure.

FIG. 10 illustrates a flowchart of operations 1000 of an exemplary embodiment consistent with the present disclosure. At operation 1010, backward dependencies within a loop body of code are identified. The identification may include generating an SSA analysis of the loop body and generating an LDG based on the SSA. The LDG may provide nodes, associated with vectorization units, and edges, associated with dependence relations between the nodes. At operation 1020, one or more ranges of iterations within the loop body are selected. The ranges are selected to exclude the identified backward dependencies. At operation 1030, the selected ranges are vectorized. The selected ranges may be executed on a vector processor.

Figure 11:
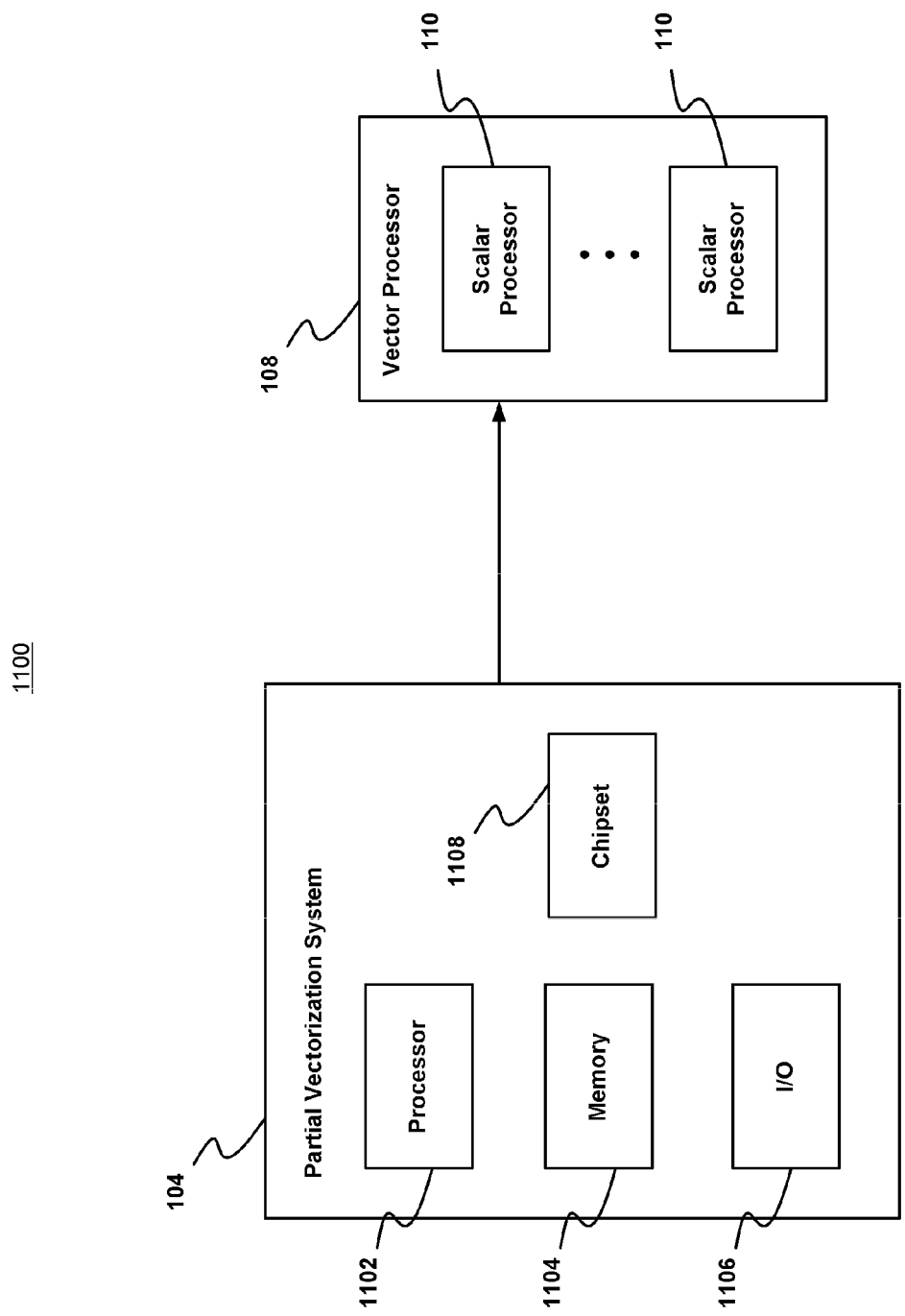
FIG. 11 illustrates a system level block diagram of one exemplary embodiment consistent with the present disclosure.

FIG. 11 illustrates an exemplary configuration of a partial vectorization system 104 and a vector processor 108 consistent with the present disclosure. Partial vectorization system 104 may include a processor 1102, a memory 1104, an input/output (I/O) interface 1106 and a chipset 1108. Vector processor 108 may include a number of scalar processors 110.

Processor 1102 may be any suitable processor, including but not limited to general purpose processors and application specific integrated circuits. Such processors may be capable of executing one or multiple threads on one or multiple processor cores. Without limitation, processors 1102 are preferably general purpose processors, such as but not limited to the general purpose processors commercially available from Intel Corp. and Advanced Micro Devices (AMD). Furthermore, while FIG. 11 illustrates a partial vectorization system containing a single processor, multiple processors may be used.

Memory 1104 may be any suitable type of computer readable memory. Examples of such memory include but are not limited to: semiconductor firmware memory, programmable memory, non-volatile memory, read only memory, electrically programmable memory, random access memory, flash memory (which may include, for example NAND or NOR type memory structures), magnetic disk memory, optical disk memory, combinations thereof, and the like. Additionally or alternatively, computer readable media may include other and/or later-developed types of computer-readable memory.

I/O 1106 may include hardware (i.e., circuitry), software, or a combination of hardware and software that allows partial vectorization system 104 to output partially vectorized code consistent with the present disclosure to vector processor 108 for parallel execution on scalar processors 110.

Chipset 1108 may include circuitry that is appropriate for the partial vectorization system. For example, where partial vectorization system is desktop computer or a notebook computer, chipset 1108 may include circuitry suitable for a desktop computer platform or a notebook computer platform. In any case, circuitry within chipset 1108 may include integrated circuit chips, such as but not limited integrated circuit chips commercially available from Intel Corp. Of course, other types of integrated circuit chips may also be used.

In some embodiments, the vector processor may provide hardware support (e.g., in the form of vector instructions) to provide increased performance in connection with the partial vectorization techniques described above. These vector instructions may include instructions to manipulate predicate vectors to support iteration range selection. The vector instructions may also include instructions to detect enabling conditions and boundary conditions. The vector instructions may also include instructions to propagate element values within a vector to support scalar update and propagation to subsequent iterations. The vector instructions may also include instructions to generate and commit temporary copies in support of speculative execution.

Embodiments of the methods described herein may be implemented in a system that includes one or more storage mediums, for example a computer readable storage medium, having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may include, for example, singly or in any combination, hard-wired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides technologies (e.g., systems, methods and computer readable storage media) for generating and executing partially vectorized code that may include backward dependencies within a loop body of the code to be vectorized.

The system may include a partial vectorizing compiler configured to identify backward dependencies within a loop body of the code, select one or more ranges of iterations within the loop body, the selected ranges exclude the identified backward dependencies, and vectorize the selected ranges. The system of this example may also include a vector processor configured to execute the selected ranges.

Another example system includes the forgoing components and the partial vectorizing compiler is further configured to generate an SSA analysis of the loop body; to generate an LDG based on the SSA of the loop body, the LDG including nodes and edges, the nodes associated with vectorization units of the SSA and the edges associated with dependence relations between the nodes, and the vectorization units include statements, expressions and operations, and the dependence relations include CDEs and DDEs; and to partition the LDG into one or more first-type regions and one or more second-type regions, the first-type regions include dependency loops and the second-type regions do not include dependency loops.

Another example system includes the forgoing components and the partial vectorizing compiler is further configured to identify nested loops, the nested loops including an inner loop and an outer loop; flatten the inner loop; and concatenate iterations of the inner loop, the iterations associated with one or more invocations of the inner loop.

Another example system includes the forgoing components and the vector processor is further configured to provide predicated vector instruction execution and loop iteration range enabling.

Another example system includes the forgoing components and the vector processor is further configured to detect an error in the identification of the backward dependencies and correct execution flow of the loop body code to recover from the detected error.

According to another aspect there is provided a method. The method may include identifying backward dependencies within a loop body of the code. The method of this example may also include selecting one or more ranges of iterations within the loop body, and the selected ranges exclude the identified backward dependencies. The method of this example may further include vectorizing the selected ranges.

Another example method includes the forgoing operations and the identifying further includes generating an SSA analysis of the loop body; generating an LDG based on the SSA of the loop body, the LDG including nodes and edges, the nodes associated with vectorization units of the SSA and the edges associated with dependence relations between the nodes, and the vectorization units include statements, expressions and operations, and the dependence relations include CDEs and DDEs.

Another example method includes the forgoing operations and further includes determining dependence distances between the nodes of the LDG, the dependence distances associated with the edges of the LDG; and deleting one or more of the edges if the dependence distance associated with the edge equals or exceeds a vectorization length associated with a vector processor.

Another example method includes the forgoing operations and further includes partitioning the LDG into one or more first-type regions and one or more second-type regions, and the first-type regions include dependency loops and the second-type regions do not include dependency loops.

Another example method includes the forgoing operations and further includes identifying nested loops, the nested loops including an inner loop and an outer loop; flattening the inner loop; and concatenating iterations of the inner loop, the iterations associated with one or more invocations of the inner loop.

Another example method includes the forgoing operations and further includes configuring a vector processor to provide predicated vector instruction execution and loop iteration range selection.

Another example method includes the forgoing operations and further includes executing the selected ranges on the vector processor.

Another example method includes the forgoing operations and the executing further includes detecting an error in the identification of the backward dependencies; and correcting execution flow of the loop body code to recover from the detected error.

According to another aspect there is provided at least one computer-readable storage medium having instructions stored thereon which when executed by a processor, cause the processor to perform the operations of the method as described in the examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system for processing partially vectorized code, said system comprising:
   a partial vectorizing compiler to:
   determine hot paths and cold paths within a loop body;
   remove any determined cold paths from consideration for vectorization;
   identify backward dependencies within a plurality of iterations within the loop body of said code, wherein at least one of said plurality of iterations includes at least one backward dependency, wherein said identifying includes:
   generating a static single assignment (SSA) analysis of said loop body;
   generating a loop dependence graph (LDG) based on said SSA of said loop body, said LDG comprising nodes and edges, wherein said nodes are associated with vectorization units of said SSA and said edges are associated with dependence relations between said nodes, and wherein said vectorization units comprise statements, expressions and operations, and said dependence relations comprise control dependence edges (CDE) and data dependence edges (DDE);
   partitioning said LDG into one or more first-type regions and one or more second-type regions, wherein said first-type regions comprise backward dependency loops and said second-type regions do not comprise backward dependency loops; and
   classifying at least one first-type region into a first category including loops having induction variables, a second category including strictly sequential backward dependency loops or a third category including conditionally vectorized backward dependency loops;
   select one or more ranges of said plurality of iterations within said loop body, wherein said selected ranges exclude said identified backward dependencies, and vectorize said selected ranges; and
   a vector processor to execute said selected ranges, wherein said vector processor is a hardware processor including one or more scalar processors.

2. The system of claim 1, wherein said partial vectorizing compiler is further configured to, prior to identifying said backward dependencies within said plurality of iterations:
   identify an inner loop and an outer loop within said sub-loop body;
   flatten said inner loop; and concatenate iterations of said inner loop, said iterations associated with one or more invocations of said inner loop.

3. The system of claim 1, wherein said vector processor is further configured to provide predicated vector instruction execution and loop iteration range enabling.

4. The system of claim 1, wherein said vector processor is further configured to:
detect an error in said identification of said backward dependencies; and
correct execution flow of said loop body code to recover from said detected error.

5. A method for partial vectorization of code, said method comprising:
determining hot paths and cold paths within a loop body;
removing any determined cold paths from consideration for vectorization;
identifying backward dependencies within a plurality of iterations within the loop body of said code, wherein at least one of said plurality of iterations includes at least one backward dependency, wherein said identifying comprises:
generating a static single assignment (SSA) analysis of said loop body;
generating a loop dependence graph (LDG) based on said SSA of said loop body, said LDG comprising nodes and edges,
wherein said nodes are associated with vectorization units of said SSA and said edges are associated with dependence relations between said nodes, and
wherein said vectorization units comprise statements, expressions and operations, and said dependence relations comprise control dependence edges (CDE) and data dependence edges (DDE);
partitioning said LDG into one or more first-type regions and one or more second-type regions, wherein said first-type regions comprise backward dependency loops and said second-type regions do not comprise backward dependency loops; and
classifying at least one first-type region into a first category including loops having induction variables, a second category including strictly sequential backward dependency loops or a third category including conditionally vectorized backward dependency loops;
selecting one or more ranges of said plurality of iterations within said loop body, wherein said selected ranges exclude said identified backward dependencies; and
vectorizing said selected ranges.

6. The method of claim 5, further comprising:
determining dependence distances between said nodes of said LDG, said dependence distances associated with said edges of said LDG; and
deleting one or more of said edges if said dependence distance associated with said edge equals or exceeds a vectorization length associated with a vector processor.

7. The method of claim 5, further comprising, prior to identifying said backward dependencies within said plurality of iterations:
identifying an inner loop and an outer loop within said sub-loop body;
flattening said inner loop; and
concatenating iterations of said inner loop, said iterations associated with one or more invocations of said inner loop.

8. The method of claim 5, further comprising configuring a vector processor to provide:

predicated vector instruction execution; and
loop iteration range selection.

9. The method of claim 8, further comprising executing said selected ranges on said vector processor.

10. The method of claim 9, wherein said executing further comprises:
detecting an error in said identification of said backward dependencies; and
correcting execution flow of said loop body code to recover from said detected error.

11. A non-transitory computer-readable storage medium having instructions stored thereon which when executed by a processor result in the following operations for partial vectorization of code, said operations comprising:
determining hot paths and cold paths within a loop body;
removing any determined cold paths from consideration for vectorization;
identifying backward dependencies within a plurality of iterations within the loop body of said code, wherein at least one of said plurality of iterations includes at least one backward dependency, wherein said identifying comprises:
generating a static single assignment (SSA) analysis of said loop body;
generating a loop dependence graph (LDG) based on said SSA of said loop body, said LDG comprising nodes and edges,
wherein said nodes are associated with vectorization units of said SSA and said edges are associated with dependence relations between said nodes, and
wherein said vectorization units comprise statements, expressions and operations, and said dependence relations comprise control dependence edges (CDE) and data dependence edges (DDE);
partitioning said LDG into one or more first-type regions and one or more second-type regions, wherein said first-type regions comprise backward dependency loops and said second-type regions do not comprise backward dependency loops;
classifying at least one first-type region into a first category including loops having induction variables, a second category including strictly sequential backward dependency loops or a third category including conditionally vectorized backward dependency loops;
selecting one or more ranges of iterations within said at least one sub-loop body, wherein said selected ranges exclude said identified backward dependencies; and
vectorizing said selected ranges.

12. The non-transitory computer-readable storage medium of claim 11, further comprising the operations of:
determining dependence distances between said nodes of said LDG, said dependence distances associated with said edges of said LDG; and
deleting one or more of said edges if said dependence distance associated with said edge equals or exceeds a vectorization length associated with a vector processor.

13. The non-transitory computer-readable storage medium of claim 11, further comprising the operations of, prior to identifying said backward dependencies within said plurality of iterations:
identifying an inner loop and an outer loop within said sub-loop body;
flattening said inner loop; and
concatenating iterations of said inner loop, said iterations associated with one or more invocations of said inner loop.

14. The non-transitory computer-readable storage medium of claim 11, further comprising the operations of providing:
   predicated vector instruction execution; and
   loop iteration range selection.

15. The non-transitory computer-readable storage medium of claim 11, further comprising the operations of executing said selected ranges on a vector processor.

16. The non-transitory computer-readable storage medium of claim 15, wherein said executing further comprises the operations of:
   detecting an error in said identification of said backward dependencies; and
   correcting execution flow of said loop body code to recover from said detected error.

* * * * *